United States Patent [19]

Fortin et al.

[11] Patent Number: 4,977,702
[45] Date of Patent: Dec. 18, 1990

[54] PROCESS FOR GROWING PLEUROTUS

[75] Inventors: J. André Fortin, Neufchatel; Laurence Thomas, Quebec, both of Canada

[73] Assignee: Universite Laval, Quebec, Canada

[21] Appl. No.: 343,352

[22] Filed: Apr. 26, 1989

[51] Int. Cl.$^5$ .............................................. A01G 1/04
[52] U.S. Cl. ........................................................ 47/1.1
[58] Field of Search ...................... 47/1.1; 435/254–256

[56] References Cited

U.S. PATENT DOCUMENTS

| | | | |
|---|---|---|---|
| 3,286,399 | 11/1966 | Laniece | 47/1.1 |
| 3,335,521 | 8/1967 | Sohm | 47/1.1 |
| 4,121,525 | 10/1978 | Courtis | 47/1.1 |
| 4,852,297 | 8/1989 | Moren | 47/1.1 |

FOREIGN PATENT DOCUMENTS

| | | | |
|---|---|---|---|
| 0085928 | 8/1983 | European Pat. Off. | 47/1.1 |
| 3736957 | 5/1989 | Fed. Rep. of Germany | 47/1.1 |
| 3148981 | 6/1988 | Japan | 435/254 |
| 2028082 | 3/1980 | United Kingdom | 47/1.1 |

*Primary Examiner*—James R. Feyrer
*Attorney, Agent, or Firm*—Cushman, Darby & Cushman

[57] ABSTRACT

A method for the production of edible mushrooms, particularly Pleurotus or Volvaria, wherein the inoculum or spawn is in liquid suspension and the substrate is packed before pasteurization. The substrate contained in a specially adapted plastic bag which is no more handled during the following steps: pasteurization, inoculation. The bag is a specially adapted plastic bag which is provided with a number of gas exchange surfaces or membranes which are impervious to outside microorganisms thereby avoiding contamination of the nutrient substrate by outside microorganisms. Inoculation can be performed by injection of the inoculum in suspension through the plastic bag.

4 Claims, 1 Drawing Sheet

PROCESS FOR GROWING PLEUROTUS

BACKGROUND OF THE INVENTION

For the production of Pleurotus mushroom according to the method in bags, it has been customary in the past to pasteurize a substrate, inoculate it with spawn seeds, transfer the mixture into the plastic bags, and after a suitable method of incubation, to collect the mushrooms at maturity. The inoculation is performed by mixing the substrate and the fungus seeds of Pleurotus in the open air. This operation also requires for the pasteurization room to remain open for several hours. Moreover, since it is highly desirable to prevent contamination from contact with microbial propagules in the air, the transfer of the inoculated pasteurized substrate from one container to plastic bags involves some difficulty and some contamination are always involved.

The closest known prior art is U.S. Pat. No. 2,851,821 wherein spawn is grown in a plastic bag. The bag is closed by turning the ends of the bag in, forming a chimney and it is sealed by placing a wad of cotton or the like in the chimney thus formed. In another embodiment, a tube is inserted in the top of the bag and the bag gathered around the tube with a string. A filter plug is then placed in the tube.

Another method is described in U.S. Pat. No. 4,027,427 wherein the spawn is grown in a plastic bag provided with a temporary filter cover. This bag is provided with a removable closure means for filling the bag and maintaining sterility during the processing steps.

Both U.S. Pat. Nos. 2,851,821 and 4,027,427 are only related to the aseptic preparation of mushroom's spawn in a plastic bag and can not be applied for the actual mushroom production in a pasteurized substrate. Moreover, in both cases the substrate is sterilized rather than pasteurized.

If, this plastic bag was to be used for the purpose of the present invention, it could only contain 2 to 3 kg of substrate. Because it is so small, it could only be inoculated at one point (from the top), which would lead to an asymmetric distribution of the inoculum and an irregular spawn running. Further, the actual industrial production of the mushrooms requires 20 to 30 kg bags which could not be handled in this way.

Although such a bag prevents the risk of contamination for spawn production, it is not useful for the process of growing Pleurotus. Since Pleurotus fruit grow along the axis, it prefers a bag which permits its fructification along the side of the bag.

Furthermore, the plastic bag for the production of Pleurotus can contain up to 30 kg of substrate and requires a mushroom's spawn that grow faster than the internal bacterial microflora. Thus, it is needed that the spawn running start simultaneously and therefore, the inoculation has to be performed at several different points. The multiple inoculation of the substrate for the production of Pleurotus is so required, because the substrate is in the form of a rigid straw roll and cannot be mixed like the grain spawn to homogenize the inoculum distribution.

Further, the method of mass pasteurization creates differences in the aeration and the moisture within the substrate, leading to variations in yields between the rolls.

Another disadvantage is the number of handlings of the substrate. The substrate is twice handled, when placed into the chamber, and when inoculated.

Thus, it would be desirable to find a process which can enable the inoculation of the substrate without risking any contamination and permitting the mushroom growth along the horizontal axis.

It would also be highly desirable to have a plastic bag provided with perforations which would easily permit the mushroom fructification. This would results in a mushroom's shape of premium quality.

SUMMARY OF THE INVENTION

In accordance with the present invention, there is provided an improved method for growing Pleurotus wherein the inoculum is in liquid suspension thereby permitting its injection through the plastic bag containing the pasteurized substrate.

Thus it is not necessary to transfer the spawn from one vessel to another, avoiding the risk of contamination and also the difficulty and expense of handling the finished spawn.

It is also possible by this process to inject the inoculum through the walls of the bag which is preferably placed vertically, thereby optimizing room space and yield surface.

However, the most important advantage of the present invention is the prevention of contamination within the bag through the pasteurization in the bags and the injection of the liquid inoculum.

Furthermore, the pasteurization in the bags reduce the variations in yields between the rolls.

Another advantage of the present invention is that it reduces the number of substrate handlings from two to one, permitting the easy high mechanization of the whole process.

BRIEF DESCRIPTION OF THE DRAWINGS

In the drawings forming part of this application.

DETAILED DESCRIPTION OF THE INVENTION

Figure 1:
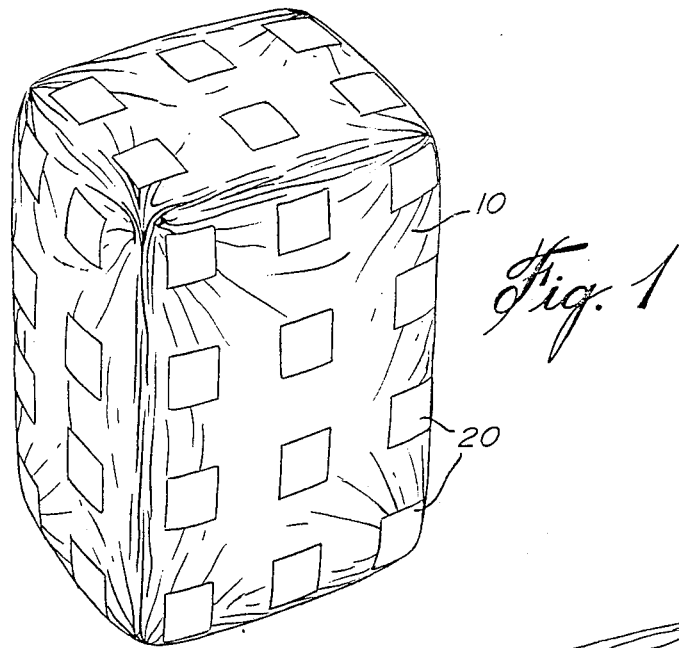
FIG. 1 show a plan view of the plastic bag with the gas exchange membranes.
Figure 2:
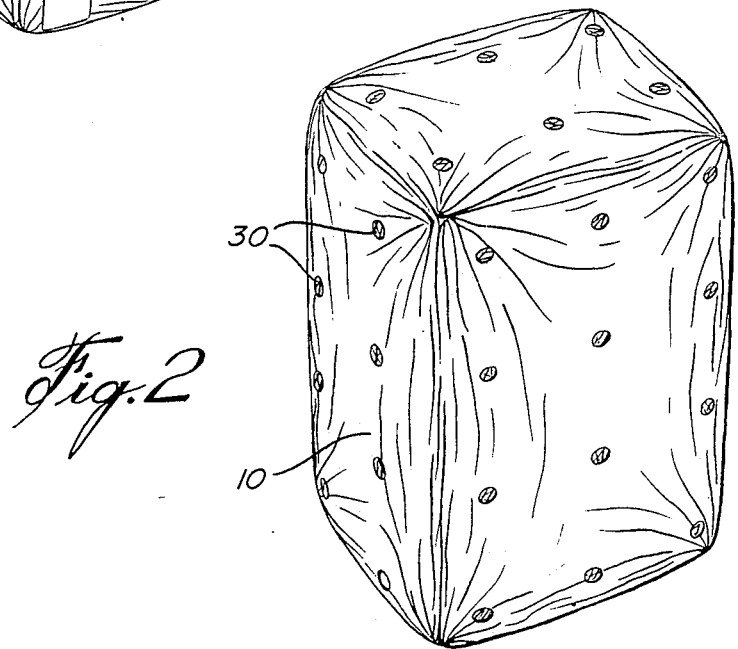
FIG. 2 show a plan view of the plastic bag without the gas exchange membranes.

More specifically, the essential and unexpected feature of the present invention is that it provides for the production of edible mushrooms such as Pleurotus or Volvaria in a non-contaminated, fully sterile or pasteurized medium.

In accordance with the present invention, the first step is the packaging of the substrate into a plastic bag provided with a number of gas exchange surfaces or membranes which are impervious to outside organisms thereby avoiding contamination of the nutrient substrate by outside microorganisms. The plastic bag (10), characterized by its opacity and its water resistance capacity, is provided with perforations (30) of 3 cm in diameter which are 10 cm apart. These perforations (30) are covered by gas exchange membranes (20) which are permeable to air and impermeable to particles like dust, powder and microorganisms. As an example, the plastic bag (10) can be made of polyethylene which is sold by: First Brands Industries Corporation under the trademark Glad ®. The gas exchange membranes (20), as an example, are made of a porous material which is sold by Dupont Company, Wilmington, Del., U.S.A. 19898, under the name Tyvek®. More specifically, the Tyvek° used is of type 10 style 1059B characterized by its opacity of 85 Eddy, its porosity of 11-31 sec./100 cc./sq. in., its water resistance through the hydrostatic pressure test of 47-73 in., and having no antistatic agents or aerosol sprays. The nutrient substrate is packaged into the plastic bag (10) to form rolls of 10 to 30 kg. The straw is preferably cut into pieces of 5 cm, is soaked for 12 hours and is finally drained.

The second step is the substrate pasteurization, which is preferably carried out in two phases. Thereafter, the substrate is cooled during the night. The second step comprises raising the temperature of the substrate between 70° to 80° C. through water vapor without the renewer air supply but in a close circuit and only for a few hours. Again, the substrate is allowed to cool down during the following night. The most important aspect of the preferred thermal treatment resides in the two temperature peaks imposed on the substrate in two different phases.

The third step of the present invention comprises inoculating the pasteurized nutrient substrate with a hyphal cell suspension of the desired mushrooms produced in liquid fermentation. The inoculum is prepared, for example, using a fermenting device of type Virtis ® or type Bellco ® with a liquid medium. Under required conditions of constant agitation and aeration of the liquid medium, the inoculum is recovered after 4 days of incubation at 25° C. Preferably, the conditions of incubation are characterized by a constant agitation of the substrate and a renewed air supply. The inoculum density of approximately 8 g of dry weight mycelium per liter of medium is obtained through the use of this method. Because the inoculum is in suspension, it renders the inoculation of the pasteurized substrate through the walls of the plastic bag possible. The inoculation is preferably made at the rate of 1 liter of inoculum per 20 kg of substrate and of 5 ml per shot.

The fourth step of the present invention comprises incubating the inoculated pasteurized nutrient medium. Once the inoculation is complete, the plastic bags are placed vertically in an incubation room. The most desired incubation conditions would be: a temperature of 24° C., a humidity factor of 90%, a total darkness and no renewed air supply. "The spawnrunning" requires 15 to 21 days depending of the roll weight.

Then, the gas exchange surface membranes are removed and the temperature is raised of 2° C., permitting the development of the fruit bodies from the appeared primordia through the perforations. A great number of fruit bodies having the normal shape and color inherent of Pleurotus or Volvaria are formed.

The sixth and last step of the present invention comprises collecting the edible mushroom at maturity from the first flush and then every 7 to 10 days for several weeks.

EXAMPLE 1

A composition comprising 97.2% in weight of damp barley straw (one part by weight of dried straw, three parts by weight of moisture), 0.4% in weight of chicken feather flour and 2.4% by weight of gypse (called also "agricultural plaster") are packaged into perforated bags (10), at the rate of 19 kg of substrate per bag. The bags are 30 cm in diameter and 80 cm in length. There are 56 perforations of 3 cm in diameter and distants of 10 cm from each other per bag. The bags containing such a substrate are vertically suspended overnight in a closed pasteurization room. Then the substrate temperature is raised to 55° C. for 5 hours under vapor pressure and renewed air flow (flow: 130 cfm, fresh air: 50%). Afterwards, the substrate is cooled to 22° C. for a night (10 hours) under fresh air (flow: 150 cfm, fresh air: 100%). Then the substrate temperature is raised again, but to 80° C. for 2 hours under vapor pressure and closed ventilation (flow: 50 cfm, fresh air: 0%), then cooled to 25° C. After cooling, the liquid fungus spawn of Pleurotus is inoculated into substrate at the rate of 1 liter suspension per bag under shots of 5 ml. After inoculation, spawnrunning is carried out in the dark at 24° C. to 26° C., depending of the fungus strains, under 90% moisture. After 15 days, the incubation room temperature is cooled to 16° C. and the bags are subjected to a photoperiod (DAYLIGHT®, day/night: 12 hr/12 hours). After 2 days, the Tyvek ® membranes (20) are removed and the room temperature is raised of 2° C. At this point, a great number of pins appear at each perforations. The first mushrooms are harvested 5 days after the Tyvek ® removing. The first flush takes 2 or 3 days. Mushrooms are harvested in clusters. Several harvests can be obtained 7 to 10 days for several weeks. The results obtained are shown in Tables 1 and 2.

TABLE 1

|  | Spawn | Inoculation | Spawnrunning |
|---|---|---|---|
| Runs of the present invention | Production of mycelial suspension in liquid medium (4 days) | 1 liter per 20 kg of substrate | 15 days |
| Classical method | Production of mycelium on millet seeds (14 days) | 1.6 kg per 20 kg of substrate | 15 days |

TABLE 2

| PASTEURISATION IN BAGS AND LIQUID INOCULATION | | | | | | |
|---|---|---|---|---|---|---|
| present | 1st harvest | | 2nd harvest | | 3rd harvest | |
| invention | First flush | yield | First flush | yield | First flush | yield |
| WITH TYVEK ® | 22nd day | 85 kg* | 30th day | 105 kg* | 43.5th day | 140 kg* |
| WITHOUT TYVEK ® | 23rd day | 79 kg* | 35th day | 100 kg* | 49th day | 102 kg* |

*kg of commerciable mushroom per ton of substrate

We claim:
1. A method for the production of edible mushrooms selected from Pleurotus and Volvaria (straw mushroom) and which comprises:
 (a) pasteurizing in two stages a nutrient substrate packaged in a heat-resistant plastic container provided with a number of gas exchange membranes impervious to outside microorganism, wherein the first pasteurization stage is effected at a range of temperature between 50° to 55° C. for a period of about 5 hours under vapor pressure and renewed air flow, followed by a cooling period of about 10 hours and the second pasteurization stage is effected at a range of temperature between 70° C. to 80° C. for a period of about 2 hours under vapor pressure and renewed air flow (b) inoculating the pasteurized nutrient substrate obtained with a hyphal cell suspension of edible mushrooms selected from Pleurotus and Volvaria produced by a liquid fermentation;

(c) incubating the inoculated nutrient substrate obtained;

(d) removing the gas exchange membranes from the surface of the container after the appearance of fruit body primordia; and (e) collecting the edible mushrooms at maturity.

2. The method of claim 1, wherein the inoculation is carried out by injection of a fungal cell suspension.

3. The method of claim 1, wherein the inoculation is done by the insertion of wooden sticks or rods within which the desired edible mushroom mycelium has been developed.

4. In a method for the production of edible mushrooms selected from Pleurotus and Volvaria (straw mushroom) by the steps of (a) packaging the nutrient substrate in a heat-resistant plastic container provided with a number of gas exchange membranes impervious to outside microorganism;

(b) inoculating the packaged nutrient substrate with a hyphal cell suspension of edible mushrooms selected from Pleurotus and Volvaria produced by a liquid fermentation; (c) incubating the inoculated nutrient substrate; (d) removing the gas exchange membranes from the surface of the container after the appearance of fruit body primordia; and (e) collecting the edible mushrooms at maturity, the improvement which consists in pasteurizing in two stages the packaged nutrient substrate after step (a) and before step (b) and wherein the first pasteurization state is effected at a range of temperature between 50° to 55° C. for a period of about 5 hours under vapor pressure and renewed air flow, followed by a cooling period of about 10 hours and the second pasteurization stage is effected at a range of temperature between 70° to 80° C. for a period of about 2 hours under vapor pressure and renewed air flow.

* * * * *